US 6,575,471 B1

(12) United States Patent
Grosspietsch et al.

(10) Patent No.: US 6,575,471 B1
(45) Date of Patent: Jun. 10, 2003

(54) CYLINDER FOR A HYDRAULIC SYSTEM

(75) Inventors: Wolfgang Grosspietsch, Schweinfurt (DE); Dieter Gebauer, Geldersheim (DE); Boleslaw Tulaczko, Niederwerrn (DE); Volker Stampf, Schweinfurt (DE); André Gemeinhardt, Obereuerheim (DE); Klaus Krappmann, Gochsheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/541,305

(22) Filed: Apr. 3, 2000

(30) Foreign Application Priority Data

Apr. 15, 1999 (DE) .......................... 199 17 006

(51) Int. Cl.[7] .......................... B60T 11/236; F16J 15/32
(52) U.S. Cl. .................... 277/436; 277/437; 277/577
(58) Field of Search .................. 277/435, 436, 277/437, 438, 439, 549, 551, 553, 554, 562, 566, 572–577

(56) References Cited

U.S. PATENT DOCUMENTS

| 2,815,973 A | * | 12/1957 | Jackson |
| 3,037,781 A | * | 6/1962 | Peras |
| 3,282,594 A | * | 11/1966 | Wheeler |
| 3,720,418 A | * | 3/1973 | Berg |
| 4,053,166 A | * | 10/1977 | Domkowski |
| 4,169,604 A | * | 10/1979 | Heathcott |
| 4,635,945 A | * | 1/1987 | Beck |
| 5,332,234 A |   | 7/1994 | Forch et al. .................. 277/48 |
| 5,513,556 A | * | 5/1996 | Schaefer |
| 6,203,022 B1 | * | 3/2001 | Struschka et al. |
| 6,209,882 B1 | * | 4/2001 | Riess |

FOREIGN PATENT DOCUMENTS

| DE | 197 14 844 | 10/1998 | ........... F16J/15/32 |
| EP | 0 317 903 | 11/1988 | ........... F16J/15/32 |
| FR | 1 385 882 | 5/1972 | ........... F16J/15/32 |
| FR | 1 481 912 | 3/1975 | ........... F16J/15/32 |
| GB | 2 018 694 | 4/1979 | ........... B62D/5/10 |
| GB | 2 095 348 | 3/1982 | ........... F16J/15/12 |
| GB | 2 152 598 | 8/1985 | ........... F16J/15/32 |
| GB | 2 267 131 | 11/1993 | ........... F16J/15/32 |

* cited by examiner

Primary Examiner—Anthony Knight
Assistant Examiner—Vishal Patel
(74) Attorney, Agent, or Firm—Cohen, Pontani, Lieberman & Pavane

(57) ABSTRACT

In a cylinder for a hydraulic system, a seal has a sealing bead clamped between a housing of the cylinder and a supporting part which holds the sealing bead in a deformed state by pretensioning. The seal is reliably held in its intended position by the supporting part and, therefore, pressure fluctuations in the pressure space do not cause a relative movement of the seal and wear of the sealing bead.

12 Claims, 1 Drawing Sheet

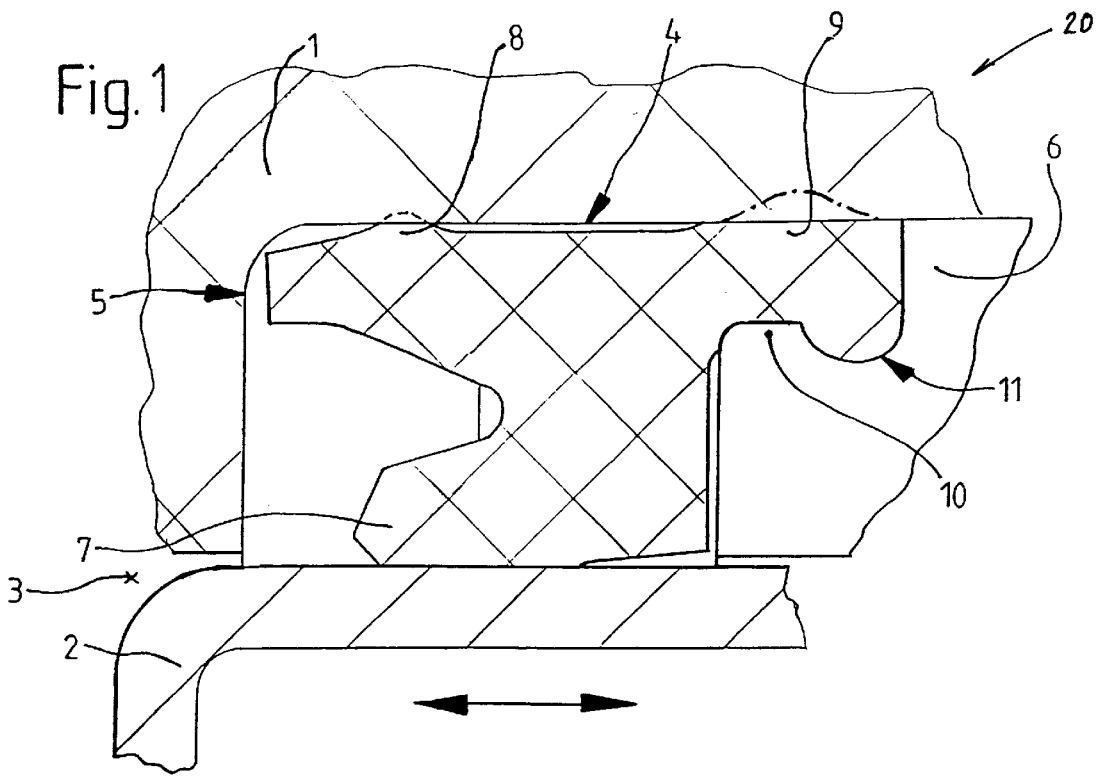
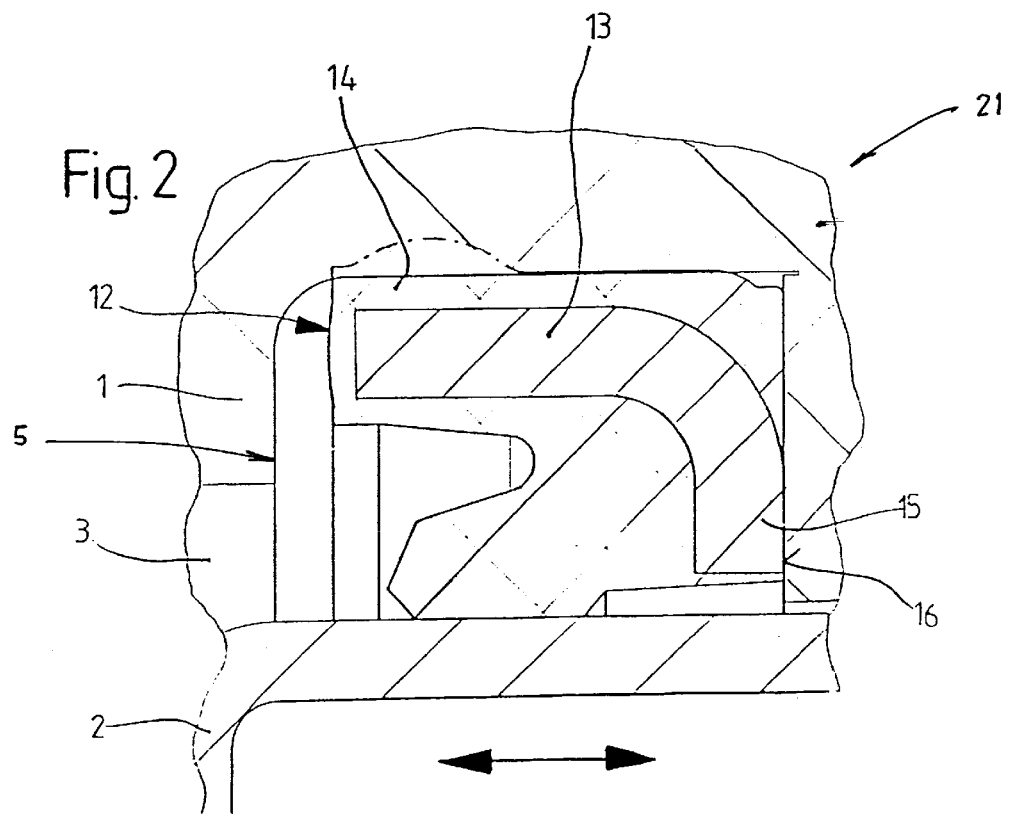

CYLINDER FOR A HYDRAULIC SYSTEM

BACKGROUND OF THE INVENTION

1. Field of the Invention

The invention is directed to a cylinder for a hydraulic system having a housing in which a seal is held in a predetermined position, the seal being produced from an elastic material and having a sealing lip for contacting a piston that is axially movably arranged in the cylinder and a sealing bead pretensioned against the housing and deformable under this pretensioning.

2. Description of the Related Art

A seal for insertion in a cylinder housing for contacting a piston movably arranged in the cylinder housing is disclosed, for example, by German reference DE A 197 14 844 A1. The seal has two sealing beads which are arranged at a distance from one another and project outward radially. These sealing beads are very narrow in relation to the width of the seal. The seal also has a sealing lip for contacting the piston. An edge of the sealing lip contacts the piston and slides during a longitudinal movement of the piston along the cylinder. This type of seal seals a pressure space of the cylinder relative to a pressure difference. In the pressureless state of the cylinder, the sealing of the pressure space is produced exclusively by the elastic pretensioning of the sealing bead and sealing lip. When there is high pressure in the pressure space, the sealing lip and the sealing bead are pressed with particularly high forces against the piston and the housing.

A problem in the known cylinder is that the sealing bead moves in the axial direction relative to the housing during pressure fluctuations in the pressure space and during oscillating movement of the piston because the seal deforms under pressure. The axial movement wears the area of the seal contacting the housing.

SUMMARY OF THE INVENTION

The object of the present invention is to design a cylinder having a housing and a seal with a sealing lip for contacting a piston axially movably mounted in the cylinder, so that a pressure space defined by the cylinder is sealed in a particularly reliable manner and exhibits particularly low wear of the seal.

According to an embodiment of the present invention, a cylinder having a housing for receiving a piston has a supporting part in the cylinder which is independent from the piston and is associated with the sealing bead for generating a supporting force required for pretensioning the sealing bead against the housing of the cylinder.

As a result of this design, the sealing bead may be pretensioned against the housing with a particularly high force given a suitable design of the supporting part. This arrangement of the supporting part avoids supporting of the sealing bead at the piston, as is done in the above-mentioned prior art. Accordingly, the inventive arrangement ensures that the sealing bead on the housing is not additionally deformed by pressure fluctuations in the pressure space. Since the seal is not deformed or axially moved by pressure fluctuations, the seal has particularly low wear and the pressure space is dependably sealed. Furthermore, volume losses and path losses are prevented in the hydraulic system through reliable holding of the seal on the housing. Particularly when the cylinder is used as a slave cylinder in the hydraulic system, the movements of the piston and pressure fluctuations in the pressure space do not result in significant wear of the seal.

According to a further embodiment of the invention, the construction of the supporting part may comprise a simple annular element formed to enclose the piston concentrically in a sleeve-shaped manner.

The annular element includes a high stability and is therefore capable of receiving especially high forces when it comprises a radial extending web along the circumference. Further, the radial extending web may be used to secure the seal in the axial direction.

In the known cylinder, the seal is inserted in a recess of the housing. The recess is defined in the axial direction by a guide sleeve. However, since the seal of the known cylinder has radial and axial play in the recess, the seal moves in the pressure space during pressure fluctuations. According to another embodiment of the present invention, movements of the seal relative to the guide sleeve are prevented in a particularly dependable manner when the supporting part is constructed in one piece with a guide sleeve which is detachably connected with the housing.

The mounting of the cylinder according to the invention is particularly simple in an embodiment of the present invention when the supporting part is arranged inside the seal.

According to another embodiment of the invention, relative movements of the seal due to especially high pressures in the pressure space are prevented in a simple structure when the supporting part directly contacts a surface of the housing or guide sleeve located opposite to the pressure space.

The sealing bead of the seal may comprise a narrow edge. However, the sealing bead may reliably hold the seal in its intended position also in case of extensive pressure fluctuations when the sealing bead is slightly wider than a distance between the supporting part and the housing.

The sealing bead may, for example, be clamped in between the guide sleeve and a sealing surface arranged perpendicular to the direction of movement of the piston. For this purpose, however, the cylinder requires an elaborate axial pretensioning of the guide sleeve. The cylinder according to the invention is constructed in a particularly simple manner when the sealing bead projects in a pipe-shaped manner from the seal and is arranged concentric to the piston.

According to another embodiment of the present invention, high pressure in the pressure space is prevented from escaping between the sealing bead and the housing when the sealing bead projecting in a pipe-shaped manner from the seal is arranged on the side of the seal located opposite to a pressure space of the cylinder. Due to this design, the seal is pushed toward the sealing bead by the pressure of the sealing space, so that the sealing bead is pressed between the housing and the supporting part.

According to another embodiment of the present invention, the seal is held in its intended position in a particularly reliable manner when a first structural component part of the cylinder has a depression for receiving a partial area of the sealing bead. The sealing bead is accordingly connected with the depressions in a positive engagement, so that movements of the remaining portion of the seal do not cause friction between the sealing bead and the housing.

Furthermore, the depression formed in a first structural component part may be formed as a circumferentially extending groove to contribute to increased tightness. The first structural component part includes at least one of the supporting part and the housing.

To facilitate the mounting of the cylinder according to the invention, the sealing bead may comprise a contour corresponding to the depression. Accordingly, the seal may be pre-mounted at the first structural component part having the depression. The seal is held at this first structural component part by the contour of the sealing bead so that a second structural component part may be mounted while the seal is held in place on the first structural component part. The depressions in the first structural component part and the contour of the sealing bead therefore act as retaining means while the cylinder according to the invention is being mounted.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 1 is a partial sectional view of a cylinder according to an embodiment of the present invention in the area of a seal; and FIG. 2 is a partial sectional view of another embodiment of the cylinder according to the present invention.

DETAILED DESCRIPTION OF THE PRESENTLY PREFERRED EMBODIMENTS

FIG. 1 is a sectional view through a partial area of a cylinder 20 comprising a housing 1 according to an embodiment of the present invention. A piston 2 is axially movably arranged in a cylindrical space enclosed by the housing 1 and the piston defines a pressure space 3 within the cylindrical space. A size of the pressure space 3 depends on the axial position of the piston 2. For the sake of clarity, the axial movement direction of the piston 2 is identified in the drawing by an arrow. The cylinder 20 may be arranged, for example, in a hydraulic system, not shown, of a clutch or a brake in a motor vehicle. The pressure space 3 is sealed by a seal 4 and is therefore arranged on one side of the seal 4. The housing 1 has a recess 5 for receiving the seal 4. This recess 5 is defined by a guide sleeve 6 which is detachably fastened to the housing 1. The seal 4 has a sealing lip 7 for contacting the piston 2 and two sealing beads 8, 9 which are pretensioned against the housing 1. One of the sealing beads 8 is located opposite the area of the sealing lip 7 for contacting the piston 2. The other sealing bead 9 is deformed by its pretensioning against the housing 1. For purposes of illustration, the pre-installation shape of the sealing beads 8, 9 of the seal 4 are shown in dash-dot lines in FIG. 1. An area of the guide sleeve 6 facing the seal 4 comprises a sleeve-shaped (i.e., axially extending) supporting part 10 which encloses the piston 2 concentrically. The supporting part 10 pretensions the sealing bead 9 remote of the pressure space 3 against the housing 1. Therefore, the forces required for pretensioning the sealing bead 9 against the housing 1 are applied by the supporting part 10 arranged on the guide sleeve 6 and are accordingly kept away from the piston 2. Furthermore, the supporting part 10 has a depression 11 formed as a circumferentially extending groove for receiving a part of the sealing bead 9 remote of the housing 1 in a positive engagement.

FIG. 2 shows a cylinder 21 according to another embodiment of the present invention. Cylinder 21 has a housing 1 with a recess 5 and a piston 2 axially movably arranged therein and defining a pressure space 3 as shown in the embodiment of FIG. 1. However, the cylinder 21 differs from the embodiment of FIG. 1 substantially in that the cylinder 21 has a supporting part 13 is arranged within a seal 12 in the recess 5. In addition, the seal 12 has only one sealing bead 14 which is deformed by pretensioning against the housing. The pre-installation shape of the sealing bead 14 is shown in dash-dot lines in FIG. 2. The supporting part 13 encloses the piston 2 concentrically in a sleeve-shaped manner. That is, the supporting part 13 has an axial extension. Furthermore, the supporting part also includes a circumferential web 15 facing radially inward at an axial end of the axial extension of the supporting part 13 facing away from the pressure space 3. The supporting part 13 is supported by the web 15 at a surface 16 of the housing 1 located opposite the pressure space 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A cylinder for a hydraulic system for axially movably receiving a piston therein, comprising:

a cylindrical housing enclosing a cylindrical space having a longitudinal axis for axially movably receiving the piston;

a seal comprising an elastic material and being held at a predetermined position in said housing, said seal comprising a sealing bead held against said housing and a sealing lip contactable with the piston that is axially movably receivable in said cylindrical space; and a guide sleeve fixedly connected to said housing and having a supporting part operatively arranged relative to said sealing bead for generating a supporting force required for pretensioning said sealing bead against said housing, said sealing bead having a pre-installation shape wider than a distance between said support part and said housing that is deformed by said supporting force.

2. The cylinder of claim 1, wherein said supporting part is operatively arranged for concentrically encircling said cylindrical space and wherein said supporting part comprises an axial extension.

3. The cylinder of claim 2, wherein said supporting part further comprises a radially extending web connected along a circumference of said axial extension.

4. The cylinder of claim 1, wherein said supporting part is arranged inside said seal.

5. The cylinder of claim 1, wherein said cylindrical space includes a pressure space arranged on one axial side of said seal when the piston is received in said cylindrical space and said housing comprises a recess for receiving said seal, said recess having a proximal end and a distal end relative to said pressure space, and said supporting part directly contacting a surface of said housing located at said distal end of said recess.

6. The cylinder of claim 1, further comprising a guide sleeve detachably connected to said housing and forming a recess with said housing for receiving said seal, wherein said cylindrical space includes a pressure space arranged on one axial side of said seal when the piston is received in said cylindrical space and said recess has a proximate end and a distal end relative to said pressure space, said supporting part directly contacting a surface of one of said housing and said guide sleeve located at said distal end of said recess.

7. The cylinder of claim 1, wherein said sealing bead projects radially outward from said seal in a pre-installation state of said seal and is concentric to said cylindrical space.

8. The cylinder of claim 7, wherein said cylinder space comprises a pressure space arranged on one axial side of said seal when the piston is received in said cylindrical space such that said seal comprises a proximal axial side and a distal axial side relative to said pressure space and said sealing bead is arranged on a distal axial side of said seal relative to said pressure space.

9. The cylinder of claim 1, wherein one of said supporting part and said housing comprises a depression for receiving at least a portion of said sealing bead.

10. The cylinder of claim 9, wherein said depression comprises a circumferentially extending groove.

11. The cylinder of claim 9, wherein said sealing bead comprises a contour corresponding to said depression.

12. The cylinder of claim 1, wherein said guide sleeve is detachably fixedly connected to said cylindrical housing.

* * * * *